United States Patent [19]

Marquardt

[11] 4,148,727
[45] Apr. 10, 1979

[54] METHOD OF DECONTAMINATING LIQUIDS

[75] Inventor: Kurt Marquardt, Holzgerlingen, Fed. Rep. of Germany

[73] Assignee: Haeger & Elsaesser, Stuttgart-Vaihingen, Fed. Rep. of Germany

[21] Appl. No.: 605,599

[22] Filed: Aug. 18, 1975

[30] Foreign Application Priority Data

Aug. 16, 1974 [DE] Fed. Rep. of Germany ....... 2439303

[51] Int. Cl.² ............................................. B01D 15/06
[52] U.S. Cl. ........................................ 210/33; 210/35; 210/82
[58] Field of Search .................. 210/20, 27, 33, 34, 210/35, 39, 40, 189, 261, 266, 268, 269, 275, 279, 283, 284, 288, 289, 73 R, 79–82

[56] References Cited

U.S. PATENT DOCUMENTS

| 3,130,151 | 4/1964 | Levendusky | 210/33 |
| 3,554,377 | 1/1971 | Miller | 210/283 |
| 3,679,581 | 7/1972 | Kunz | 210/33 |
| 3,719,591 | 3/1973 | Crits | 210/33 |
| 3,879,287 | 4/1975 | Porter | 210/189 |
| 3,960,721 | 6/1976 | Heskett | 210/283 |

FOREIGN PATENT DOCUMENTS 1767172  5/1971  Fed. Rep. of Germany ............. 210/20

Primary Examiner—Charles N. Hart
Assistant Examiner—Ivars Cintins

[57] ABSTRACT

A relatively compact and inexpensive technique for the two step decontamination of a liquid such as water is described. The liquid to be treated is propelled upwardly through a pair of vertically superposed, lower and upper chambers defined in a common treatment tank and separated by a liquid-permeable nozzle member. A first decontamination-removing substance, such as adsorbing material or an ion exchanger, is disposed in the lower chamber, while a second decontamination-removing substance such as activated charcoal is disposed in the upper chamber. The first substance, when spent, is propelled out of the lower chamber by a transport liquid, externally renewed, and recirculated back into the second chamber as a fresh charge by passing through a central pipe that extends through the upper chamber and the nozzle member to terminate in the lower chamber. The second substance, when spent, is renewed either by means of direct rinsing with the transport liquid flowing downwardly into the lower chamber as discussed above, or is first propelled out of the tank by means of such transport liquid and is then externally rinsed and then recirculated to the upper chamber. The fully-treated liquid exits from the top of the common treatment tank.

1 Claim, 2 Drawing Figures

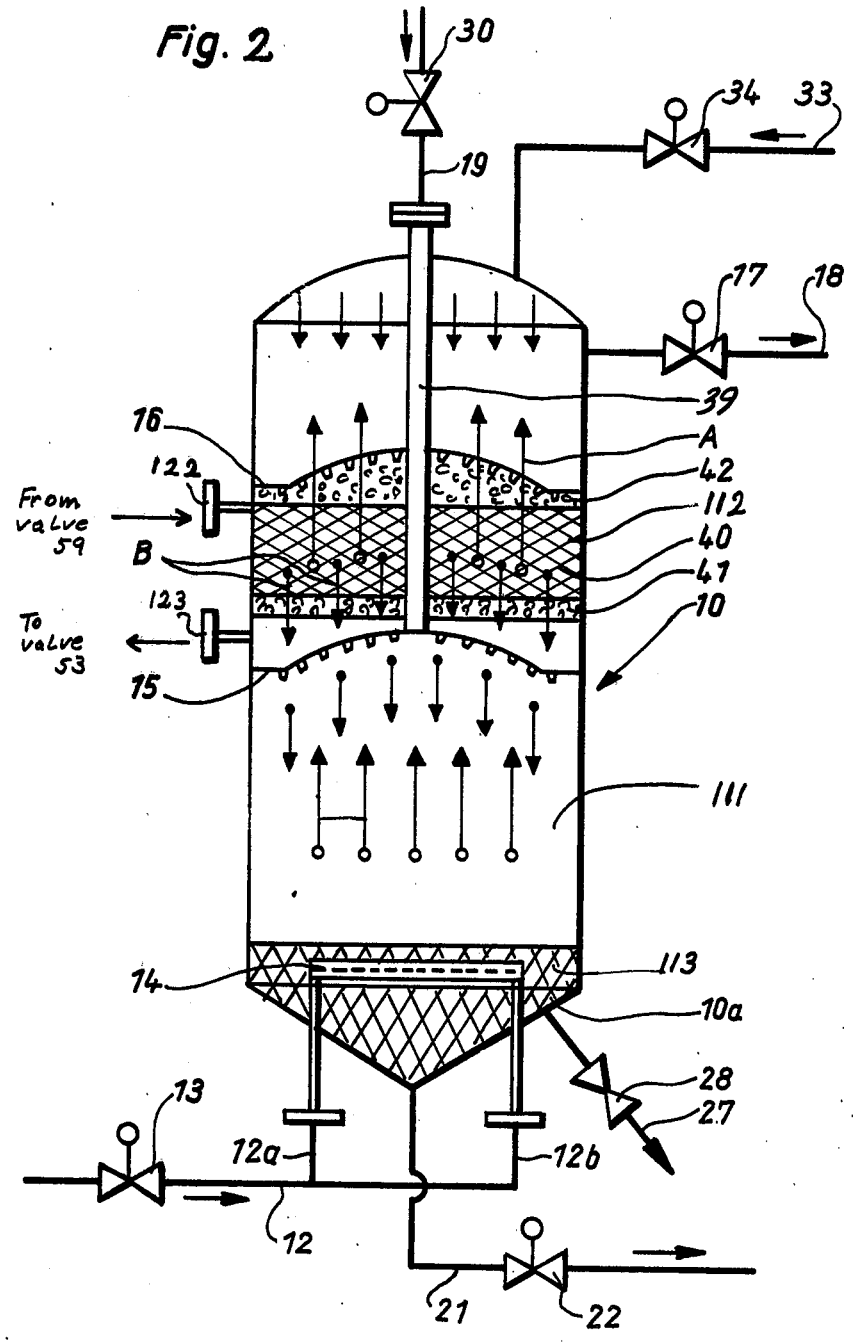

METHOD OF DECONTAMINATING LIQUIDS

BACKGROUND OF THE INVENTION

The invention relates to methods of separating impurities or contaminants from liquids such as water by means of a two-stage process.

In conventional processes and apparatus of this type, a pair of separate treatment tanks are respectively charged with contamination-removing substances, and the liquid to be treated is then propelled in tandem through the first and second tanks to be purified. Typically, the first tank is operated in selective closed-loop fashion, whereby when the associated contamination-removing substance (which may be a filtration material, adsorbing material or ion exchanger) becomes spent, a transport fluid is introduced into the top of the first tank to propel the spent substance out of the treatment tank and into a rinsing or regeneration tank for renewal, i.e., for separation of the contaminants obtained from the treated liquid. After such renewal, the regenerated substance is recirculated back into the first tank as a fresh charge.

Additonally, the separate second tank in such installations is generally operated in an open-loop fashion, whereby the contaminant-removing substance therein (e.g., a final filtration material such as activated charcoal) is renewed in situ by the passage of rinsing water therethrough.

It has been found that such two-stage decontamination facilities are space-consuming and expensive to operate.

SUMMARY OF THE INVENTION

The method of the present invention provides a technique for separating impurities from an untreated liquid in a two-step process of the general type discussed above, without incurring the attendant disadvantages indicated above.

Illustratively, the liquid to be treated is applied under pressure to the bottom of a common treatment tank, which is divided into vertically superposed, upper and lower treatment chambers separated by a liquid-permeable element. Such element is embodied as a first nozzle member that extends horizontally across the treatment tank. The liquid is propelled in succession upwardly through the lower and upper chambers, which function as the first and second separate treatment tanks of the prior art.

In order to operate the lower treatment chamber in closed-loop fashion, transport fluid such as water is introduced to the top of the common treatment tank and propelled downwardly in tandem through the upper chamber, the first nozzle member and the lower chamber to carry the spent contamination-removing substance (hereinafter "first substance") to a conventional rinsing or regeneration tank disposed outside the common treatment tank.

In order to re-charge the lower chamber, the renewed first substance is propelled from the renewal tank to the upper end of a pipe that is centrally disposed within the common treatment tank and which extends downwardly through the upper chamber and the first nozzle member to terminate at its lower end in the lower chamber.

In order to re-charge the upper chamber with the contamination-removing substance (hereinafter "second substance") therein by means of an open-loop operation, the above-mentioned transport liquid, on its way down through the upper chamber to the lower chamber, effectively rinses the spent second substance in the upper chamber without the necessity of removing such second substance from the tank.

In an alternative closed-loop operation for renewing the second substance, the transport fluid is employed to propel the spent second substance out of the tank to an external rinsing apparatus for renewal. After such renewal, the second substance is recirculated back to the upper chamber via an inlet in the side of the tank.

In order to increase the efficiency of the final filtration operation in the second tank, a bed of particulate filtering material may be disposed on the top of the first nozzle member below the main portion of the activated charcoal or other suitable second substance. Additionally, a second particulate bed of inert material may be disposed on top of the bed of activated charcoal.

BRIEF DESCRIPTION OF THE DRAWING

The invention is further set forth in the following detailed description taken in conjunction with the appended drawing, in which:

FIG. 2 is an enlarged representation of a portion of the arrangement of FIG. 1.

DETAILED DESCRIPTION

Figure 1:
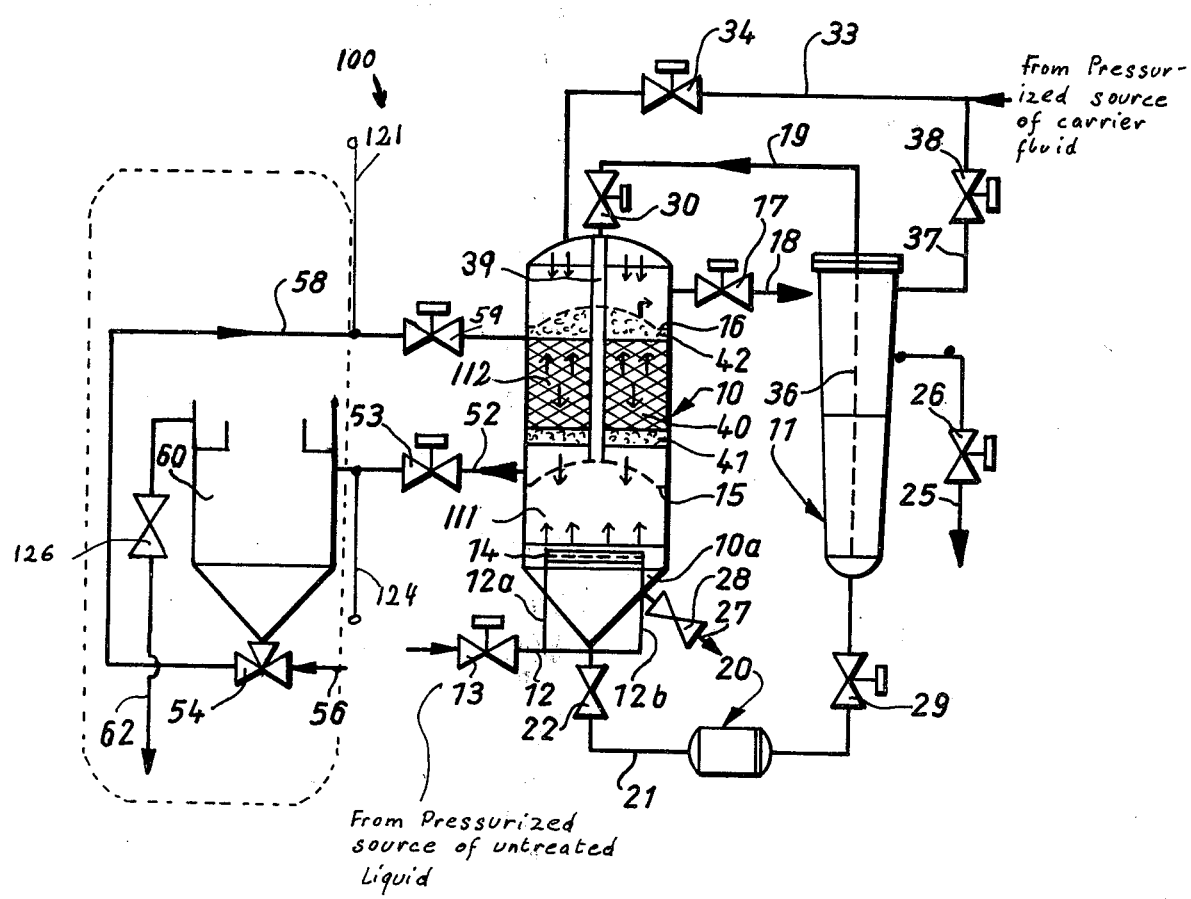
FIG. 1 is a diagrammatic representation of a two-stage decontamination facility suitable for carrying out the method of the present invention.

Referring now to drawing, FIG. 1 illustrates a two-stage decontamination installation 100 for removing impurities from a liquid, e.g. water, incident on the installation over a conduit 101. The word "impurities", as used herein, is used in a general sense to designate, without limitation, dissolved substances and suspensions in finely comminuted or emulsified form, which are to be removed from the liquid by means of the installation 100.

The water entering the conduit 101 is coupled, upon the opening of a valve 13, to a pair of pipes 12a and 12b to a conventional distributor 14 disposed in a common treatment column or tank 10. Illustratively, the pipes 12a and 12b may be telescopically arranged in order to suitably adjust the division ratio therebetween with respect to the distributor 14.

The untreated water from the distributor 14 is propelled upwardly as shown through a pair of vertically superposed chambers 111 and 112 formed integrally within the tank 10, the chambers being separated by a liquid-permeable element 15 in the form of a nozzle member. The chambers 111 and 112 respectively provide the functions of separate decontamination tanks of prior art installations.

Accordingly, a first decontamination-removing substance, represented at 113 (see FIG. 12), is introduced into the lower chamber 111 in the manner described below. Similarly the upper chamber 112 is charged with a second decontamination-removing substance represented at 40. The substance 113 may be a conventional filtration, adsorbing, or ion-exchange material, while typically the substance 40 is a final filtration material such as activated charcoal, which removes the residual impurities from the liquid entering via the conduit 101. After passing through the chambers 111 and 112, the decontaminated liquid exits from the tank 10 via an opened valve 17 and a conduit 18.

Illustratively, the decontamination operation in the lower chamber 111 proceeds in a closed-loop fashion. In particular, as the decontamination substance 113 therein becomes spent during the passage of the untreated liquid, transport water or other carrier liquid is introduced into the top of the tank 10 via a conduit 33 and an open valve 34. Such carrier liquid flows downwardly in the direction of the arrows as shown, and tranverses the upper chamber 112 and the nozzle member 15 before reaching the lower chamber 111. In such lower chamber 111, the carrier liquid propels the spent first substance 113 out of the tank via a valve 22 and a conduit 21, where it is collected in a measurement column 20. As the column 20 becomes filled, the liquid-borne spent substance is introduced into a rinsing or regeneration tank 11 through an open valve 29.

Within the tank 11, the spent substance 113 is suitably rinsed or aerated, and the decontaminants removed therefrom exit from the tank 11 via an open valve 26 and a conduit 25.

After renewal of the substance 113 in the tank 11, a valve 38 and a valve 34 are opened to introduce the above-mentioned carrier fluid under pressure into the interior of the tank 10. Such action propels the renewed substance upwardly via an immersion tube 36 extending coaxially in the tank 11, to recirculate the renewed substance into the lower chamber 111 of the treatment tank 10 via a conduit 19, an open valve 30, and a pipe 39. The pipe 39 extends downwardly through the upper chamber 112 and the nozzle member 15 and terminates at its lower end within the lower chamber 111. As a result, a new charge of the substance 113 is placed in the chamber 111 without disturbing the ambient conditions in the upper chamber 112.

Such upper chamber 112 may illustratively be operated in open-loop fashion whereby the decontamination substance 40 is renewed in situ without the necessity of removal from the tank 10. Such substance 40 is introduced initially into the tank 10 from a suitable source via a conduit 121, an open valve 59 and an inlet port 122 (FIG. 2) disposed on the side of the tank 10. Similarly, the material 40 may be removed from the chamber 112 via an outlet port 123 on the side of the tank 10, an open valve 53 (FIG. 1) and a conduit 124.

In order to operate the chamber 112 in such open-loop fashion, the activated charcoal or other decontamination material 40 is illustratively of the type that may be renewed by rinsing. Advantageously, such rinsing operation is accomplished by the carrier liquid entering the top of the tank 10 via the conduit 33 and the open valve 34, as described below. In this way, such carrier liquid serves a dual role as both a rinsing medium and a transport medium. Consequently, the renewal in situ of the material 40 corresponds to a re-charging of the upper chamber 112. Alternatively, the upper chamber 12 may be operated in closed-loop fashion with external renewal of the spent substance 40. This is accomplished with the use of the facilities shown in dotted lines in FIG. 1. When this approach is taken, the carrier liquid entering the tank 10 is employed solely as a transport medium to propel the spent substance 40 out of the chamber 112 via the conduit 52 and the valve 53. In this case, such liquid-borne spent substance is introduced into a separate rinsing tank 60, where it is rinsed by water incident in a conduit 56 and entering the tank via a multiple valve 54. The separated contaminants from the substance 40 exit from the tank 60 via a valve 126 and a conduit 62. The renewed substance in the tank 60 is recirculated to the upper chamber 112 via the valve 54, a conduit 58, the valve 59, and the inlet 122 (FIG. 2).

If desired, a separate nozzle member 16, similar to the nozzle member 15 dividing the chambers 111 and 112, may be disposed in the tank 10 to form the upper boundary of the chamber 112. While not absolutely necessary, the tank 10 may further be provided with an upper nozzle member 16 similar to the member 15 and disposed parallel thereto. The nozzle 16 in such case forms an upper boundary of the upper chamber 112.

Additionally, to aid in the final filtration operation in the chamber 112, a granular bed 41 of suitable filtration material may be disposed below the main bed of the activated charcoal 40 to form a receptacle for the impurities filtered out by the substance 40. In such case, the granular layer 41 rests directly on top of the nozzle member 15. Additionally, a second granular layer of inert material, designated at 42, may be disposed above the bed of charcoal 40. The grain size of the granules in the layer 42 is chosen to avoid a clogging of the perforations (not shown) in the overlying nozzle member 16.

As indicated, an auxiliary drain arrangement for the lower chamber 112 may be provided by associating a valve 28 and a conduit 27 with the tank 10 in the vicinity of a frustoconical lower portion 10a.

In the foregoing, an illustrative arrangement of the invention and an illustrative technique for carrying it out has been described. Many variations and modifications will now occur to those skilled in the art. For example, it will be evident that many types of untreated liquids other than water can be handled in the installation shown, and that many different types of filter, adsorbing, and ion-exchange materials can be employed as the decontamination-removing substances in the chambers 111 and 112, other than the substances specifically enumerated. It is accordingly desired that the scope of the appended claims not be limited to the specific disclosure herein contained.

What is claimed is:

1. In a method of separating impurities from an untreated liquid, comprising the steps of respectively charging first and second chambers with first and second contaminant-removing substances, propelling the untreated liquid through the first and second chambers in tandem, withdrawing purified liquid from the second chamber, the improvement wherein the propelling step is accomplished by passing the liquid upwardly through vertically superposed, upper and lower portions of a common treatment tank, the upper and lower portions being separated by a liquid-permeable element, said lower portion defining the first chamber and said upper portion defining the second chamber, and wherein the step of charging the first chamber comprises removing a spent first substance from the lower portion of the treatment tank with a transport liquid, externally renewing the spent first substance and recirculating the renewed first substance to the lower portion, and the step of charging the second chamber comprises renewing the spent second substance in situ, said second substance being of the type which may be renewed by rinsing, and the step of renewing the second substance comprises rinsing the spent second substance in the upper portion by said transport liquid propelled downwardly through the upper portion and into the lower portion.

* * * * *